(12) United States Patent
Kurokawa

(10) Patent No.: US 9,179,030 B2
(45) Date of Patent: Nov. 3, 2015

(54) IMAGE READING DEVICE, IMAGE FORMING APPARATUS, AND IMAGE READING METHOD

(71) Applicant: KYOCERA Document Solutions, Inc., Osaka (JP)

(72) Inventor: Yuichiro Kurokawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/225,533

(22) Filed: Mar. 26, 2014

(65) Prior Publication Data

US 2014/0293371 A1   Oct. 2, 2014

(30) Foreign Application Priority Data

Mar. 27, 2013  (JP) .................. 2013-066255

(51) Int. Cl.
*H04N 1/04* (2006.01)
*H04N 1/00* (2006.01)
*H04N 1/10* (2006.01)
*H04N 1/193* (2006.01)
*H04N 1/028* (2006.01)
*H04N 1/46* (2006.01)

(52) U.S. Cl.
CPC ............. *H04N 1/042* (2013.01); *H04N 1/0005* (2013.01); *H04N 1/00013* (2013.01); *H04N 1/00023* (2013.01); *H04N 1/00031* (2013.01); *H04N 1/00045* (2013.01); *H04N 1/00063* (2013.01); *H04N 1/00087* (2013.01); *H04N 1/02815* (2013.01); *H04N 1/1013* (2013.01); *H04N 1/193* (2013.01); *H04N 1/46* (2013.01); *H04N 2201/0081* (2013.01)

(58) Field of Classification Search
USPC ......... 358/1.13, 496, 1.9, 444, 474, 509, 475; 399/49; 347/129
See application file for complete search history.

(56) References Cited

U.S. PATENT DOCUMENTS 6,188,419 B1 * 2/2001 Katamoto et al. ............ 347/129
6,785,026 B1 * 8/2004 Terajima et al. .............. 358/509

(Continued)

FOREIGN PATENT DOCUMENTS

EP         0949800 A2     10/1999
JP         H11-275310 A   10/1999

(Continued)

OTHER PUBLICATIONS

The extended European search report issued by the European Patent Office on Jun. 23, 2014, which corresponds to EP 14161432.1-1502 and is related to U.S. Appl. No. 14/225,533.

*Primary Examiner* — Ngon Nguyen
(74) *Attorney, Agent, or Firm* — Studebaker & Brackett PC

(57) ABSTRACT

An image reading device includes a red light source, a green light source, a blue light source, a white reference plate, a light-amount adjusting section, a photo-detecting section, and a signal processing section. The light-amount adjusting section sets lighting periods of the red, green, and blue light sources for reading in a monochrome mode, based on: lighting periods of the red, green, and blue light sources set for reading in a color mode; and a result of detection performed by the photo-detecting section when the white reference plate is illuminated with the red light, the green light, and the blue light respectively emitted by the red, green, and blue light sources for the respective lighting periods set for reading in the color mode.

12 Claims, 5 Drawing Sheets

(56) References Cited

U.S. PATENT DOCUMENTS

| | | | |
|---|---|---|---|
| 6,992,796 B1* | 1/2006 | Taka et al. | 358/1.9 |
| 7,639,404 B2 | 12/2009 | Ikeno et al. | |
| 8,253,986 B2 | 8/2012 | Ikeno et al. | |
| 8,659,802 B2 | 2/2014 | Ikeno et al. | |
| 2006/0023267 A1 | 2/2006 | Ikeno et al. | |
| 2006/0127113 A1* | 6/2006 | Sato | 399/49 |
| 2007/0081202 A1* | 4/2007 | Miyamoto | 358/496 |
| 2008/0239412 A1 | 10/2008 | Kobayashi | |
| 2009/0303516 A1* | 12/2009 | Sai et al. | 358/1.13 |
| 2010/0060954 A1 | 3/2010 | Ikeno et al. | |
| 2010/0073739 A1* | 3/2010 | Sekiguchi et al. | 358/474 |
| 2011/0096370 A1* | 4/2011 | Okamoto | 358/444 |
| 2012/0281260 A1 | 11/2012 | Ikeno et al. | |
| 2014/0118798 A1 | 5/2014 | Ikeno et al. | |

FOREIGN PATENT DOCUMENTS

| | | |
|---|---|---|
| JP | H11-341222 A | 12/1999 |
| JP | H11-341233 A | 12/1999 |
| JP | 2000-287036 A | 10/2000 |
| JP | 2002-237922 A | 8/2002 |
| JP | 2006-065289 A | 3/2006 |

\* cited by examiner even when the image reading device reads the same original document, the amount of light detected by the photodetector may differ for each reading operation. For example, the amount of light detected by the photodetector may fluctuate depending on changes in the ambient conditions or in the light source, the optical system and/or the photodetector. In view of this, an image reading device typically applies shading correction which uses the result obtained by reading a white reference plate with a predetermined amount of light. Such shading correction reduces the fluctuations in the reading results caused by the changes in the amount of light.

IMAGE READING DEVICE, IMAGE FORMING APPARATUS, AND IMAGE READING METHOD

INCORPORATION BY REFERENCE

The present application claims priority under 35 U.S.C. §119 to Japanese Patent Application No. 2013-66255, filed Mar. 27, 2013. The contents of this application are incorporated herein by reference in their entirety.

BACKGROUND

The present disclosure relates to image reading devices, image forming apparatuses, and image reading methods.

An image reading device is used as a scanner and also as an image forming apparatus, such as a multi-function peripheral, a copier, and a facsimile machine. An image reading device reads an image of an original document by a photodetector detecting light reflected from the surface of the original document that is illuminated with light emitted by a light source.

Even when the image reading device reads the same original document, the amount of light detected by the photodetector may differ for each reading operation. For example, the amount of light detected by the photodetector may fluctuate depending on changes in the ambient conditions or in the light source, the optical system and/or the photodetector. In view of this, an image reading device typically applies shading correction which uses the result obtained by reading a white reference plate with a predetermined amount of light. Such shading correction reduces the fluctuations in the reading results caused by the changes in the amount of light.

Some image reading devices can read color images in addition to monochrome images. In the case where an image reading device is provided with a red light source, a green light source, and a blue light source, the photodetector can read color images in addition to monochrome images, by detecting red, green, and blue light respectively emitted by the red, green, and blue light sources.

For example, when the photodetector is a monochrome sensor, the red, green, and blue light sources are lighted at different times from one another in the color mode. In the monochrome mode, on the other hand, the red, green, and blue light sources are lighted at the same time to shorten the reading time. In this case, for increasing the dynamic range of the photodetector, the amounts of red, green, and blue light emitted by the red, green, and blue light sources are set separately for the color mode, which is for reading color images, and the monochrome mode, which is for reading monochrome images.

Some image reading devices set the amounts of red, green, and blue light for reading monochrome images by using the amounts of red, green, and blue light set for reading color images. In monochrome reading, some image reading devices increase the amounts of red, green, and blue light by increasing the amount of electric current supplied to each of the red, green, and blue light sources by the same percentage in order to reduce the influence of the decrease in the amount of light emission over time.

SUMMARY

An image reading device according to the present disclosure performs reading by switching between a color mode and a monochrome mode. The image reading device includes a red light source, a green light source, a blue light source, a white reference plate, a light-amount adjusting section, a photo-detecting section, and a signal processing section. The red light source emits red light. The green light source emits green light. The blue light source emits blue light. The light-amount adjusting section adjusts an amount of light to be emitted by each of the red light source, the green light source, and the blue light source. The photo-detecting section detects the red light, the green light, and the blue light emitted by the red light source, the green light source, and the blue light source, respectively. The light-amount adjusting section sets a lighting period of each of the red light source, the green light source, and the blue light source for reading in the monochrome mode. The settings are made based on: a lighting period of each of the red light source, the green light source, and the blue light source set for reading in the color mode; and a result of detection performed by the photo-detecting section when the white reference plate is illuminated with the red light, the green light, and the blue light respectively emitted by the red light source, the green light source, and the blue light source for the respective lighting periods set for reading in the color mode.

An image forming apparatus according to the present disclosure includes the above image reading device and an image forming section. The image forming section forms an image based on a result of reading by the image reading device.

An image reading method according to the present disclosure is for performing reading by switching between a color mode and a monochrome mode. The image reading method includes: determining a lighting period of each of a red light source, a green light source, and a blue light source for reading in the color mode, the determination being made by illuminating a white reference plate with red light, green light, and blue light respectively emitted by the red light source, the green light source, and the blue light source at different times; and setting lighting periods of each of the red light source, the green light source, and the blue light source for reading in the monochrome mode, the setting being made based on the lighting periods of the red light source, the green light source, and the blue light source determined for reading in the color mode, and also on a result of detection performed by a photo-detecting section when the white reference plate is illuminated with the red light, the green light, and the blue light respectively emitted by the red light source, the green light source, and the blue light source for the respective lighting periods set for reading in the color mode.

DETAILED DESCRIPTION

The following describes embodiments directed to an image reading device, an image forming apparatus, and an image reading method all according to the present disclosure, with reference to the accompanying drawings. However, the present disclosure is not limited to the specific embodiments below.

Figure 1:
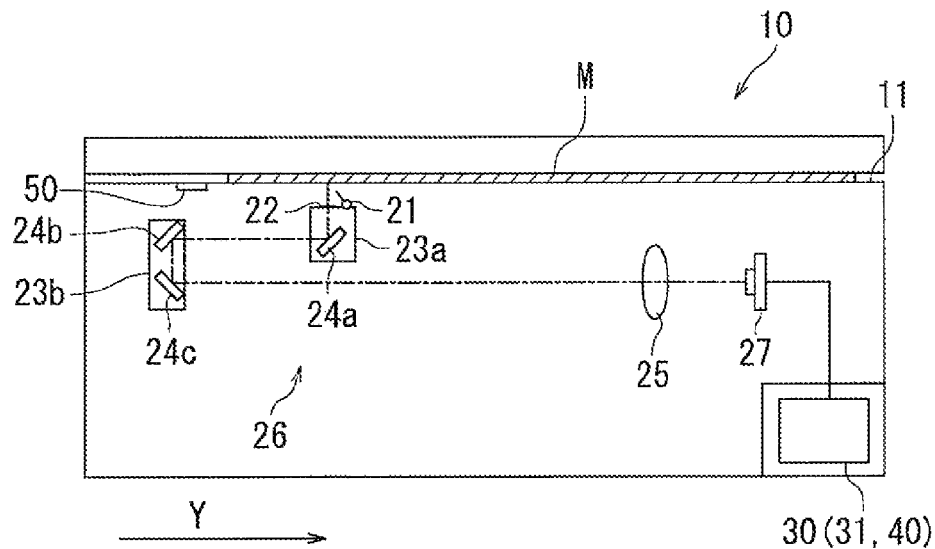
FIG. 1 is a schematic view of an image reading device according to an embodiment of the present disclosure.
Figure 2:
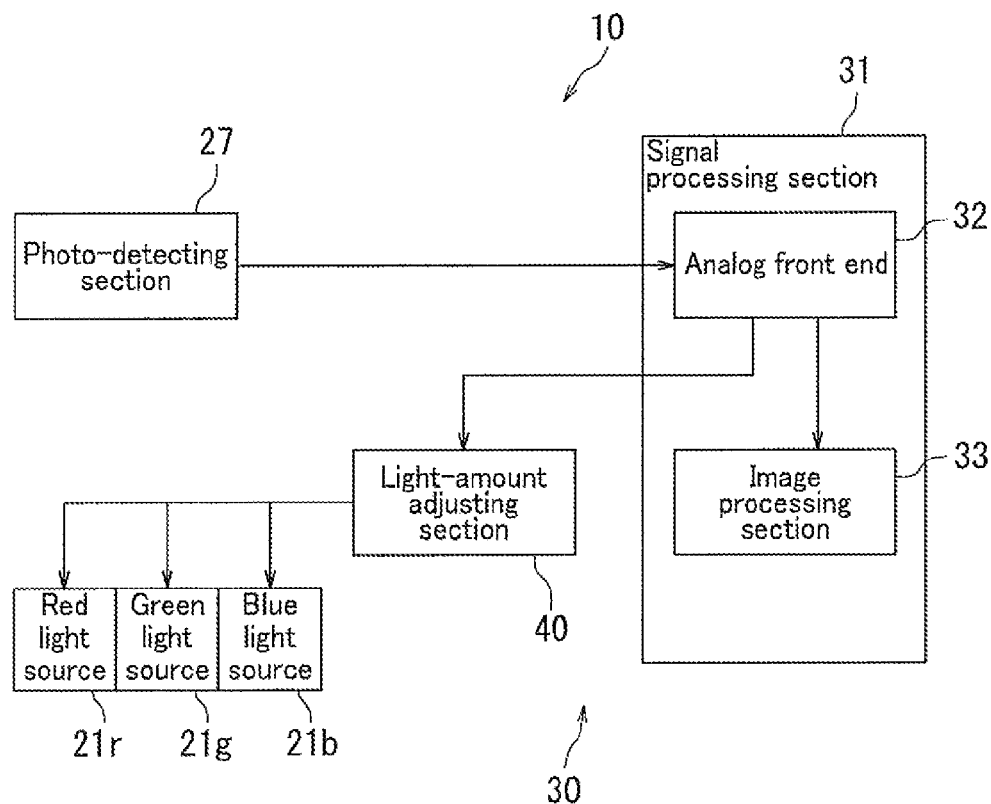
FIG. 2 is a block diagram of the image reading device according to the embodiment of the present disclosure.

With reference to FIGS. 1 and 2, the following describes an image reading device 10 as an embodiment of the present disclosure. FIG. 1 is a schematic view of the image reading device 10 according to the embodiment of the present disclosure. FIG. 2 is a block diagram of the image reading device 10 according to the embodiment of the present disclosure.

The image reading device 10 includes a light source 21 (which in turn includes a red light source 21r, a green light source 21g, and a blue light source 21b), a photo-detecting section 27, a signal processing section 31, a light-amount adjusting section 40, and a white reference plate 50. The signal processing section 31 and the light-amount adjusting section 40 are mounted on a control board 30. Typically, the image reading device 10 further includes a document table 11. The image reading device 10 reads an original document M placed on the document table 11 to obtain an input image. According to the present embodiment, the image reading device 10 is a scanner, and the original document M is paper. The image reading device 10 reads the original document M by switching between the color mode and the monochrome mode.

The light source 21, an optical system 26, and the photo-detecting section 27 are disposed below the document table 11. The red light source 21r emits red light. The green light source 21g emits green light. The blue light source 21b emits blue light. The optical system 26 includes a plurality of reflection mirrors (namely, a reflection mirror 24a, a reflection mirror 24b, and a reflection mirror 24c) and a lens 25. The light source 21 and the reflection mirror 24a are secured to a first carriage 23a. The first carriage 23a is provided with a slit 22. The reflection mirrors 24b and 24c are secured to a second carriage 23b.

Light emitted by the light source 21 reaches the photo-detecting section 27 via the optical system 26. The following describes the process in which light emitted from the light source 21 reaches the photo-detecting section 27. The light source 21 that is elongated in the main scanning direction illuminates the document table 11 from below. Here, the main scanning direction is a direction perpendicular to a paper surface of FIG. 1 (the direction not shown), and the sub-scanning direction is the Y direction. Light emitted from the light source 21 is reflected by the original document M to pass through the slit 22 to reach the reflection mirror 24a. Light reaching the reflection mirror 24a is reflected by the reflection mirror 24a and then guided by the reflection mirrors 24b and 24c to pass through the lens 25 to reach the photo-detecting section 27.

When the image reading device 10 reads the original document M, the first carriage 23a moves in the sub-scanning direction Y together with the light source 21, which is emitting light. The second carriage 23b moves to keep the optical path length constant between the light source 21 and the photo-detecting section 27.

The photo-detecting section 27 is a charge coupled device (CCD) sensor. According to the present embodiment, the photo-detecting section 27 is a monochrome sensor. The photo-detecting section 27 generates an analog electric signal by applying photoelectric conversion to the light having reached the photo-detecting section 27.

The signal processing section 31 performs signal processing on the photo-detection signal generated by the photo-detecting section 27. The signal processing section 31 includes an analog front end (AFE) 32 and an image processing section 33. The analog front end (AFE) 32 converts the analog signal into a digital signal and outputs the resulting digital signal to the image processing section 33.

The white reference plate 50 is elongated in the main scanning direction. The image reading device 10 obtains white reference data by reading the white reference plate 50.

The image processing section 33 applies shading correction based on the white reference data. The shading correction is applied to the result obtained by reading the original document M to prevent degradation in the read image resulting from non-uniform light emission by the light source 21 or non-uniform sensitivity of the photo-detecting section 27. In addition, the shading correction is applied to the result obtained by reading the original document M also to prevent degradation in the read image resulting from non-uniform aging degradation of the light source 21, the optical system 26, and/or the photo-detecting section 27.

Preferably, the shading correction is applied based on the white reference data and black reference data. The image reading device 10 turns off the red, green, and blue light sources 21r, 21g, and 21b to obtain the black reference data. Alternatively, in the case where the image reading device 10 is additionally provided with a black reference plate, the image reading device 10 obtains the black reference data by separately illuminating the black reference plate with red, green, and blue light emitted respectively by the red, green, and blue light sources 21r, 21g, and 21b. The black reference data may be obtained prior to the reading of the original document M. Alternatively, the black reference data may be determined in advance. For example, the light-amount adjusting section 40 may store the black reference data obtained before the factory shipment.

The lighting periods of the red, green, and blue light sources 21r, 21g, and 21b are controlled by pulse width modulation (PWM) control. The red, green, and blue light sources 21r, 21g, and 21b respectively emit red, green, and blue light each for the High duration of a corresponding pulse signal (PWM signal), for example. In the following description of the present disclosure, the High duration of a pulse signal may be referred to as a pulse width. The respective amounts of light emitted by the red, green, and blue light sources 21r, 21g, and 21b are each proportional to the High duration of the corresponding pulse signal, or equivalently, to the lighting period of the light source.

Preferably, the respective amounts of light to be emitted by the red, green, and blue light sources 21r, 21g, and 21b are appropriately adjusted at the time of reading the original document M. The image reading device 10 adjusts the pulse widths so as to appropriately adjust the amount of light to be emitted by a corresponding one of the red, green, and blue light sources 21r, 21g, and 21b in a manner that the resulting white reference data approaches the target value. The image reading device 10 can appropriately read the original document M by lighting the red, green, and blue light sources 21r, 21g, and 21b each with the pulse signal having the appropriately adjusted pulse width.

The photo-detection signal generated by the photo-detecting section 27 is output to the analog front end 32 where the photo-detection signal is converted from analog to digital. The resulting digital signal is input to the image processing section 33 and the light-amount adjusting section 40.

The light-amount adjusting section 40 adjusts the amounts of the red, green, and blue light to be emitted by the red, green, and blue light sources 21r, 21g, and 21b, respectively. In particular, the light-amount adjusting section 40 adjusts the pulse widths to be applied to the red, green, and blue light sources 21r, 21g, and 21b, thereby to adjust the respective amounts of the red, green, and blue light emitted by the red, green, and blue light sources 21r, 21g, and 21b. The light-amount adjusting section 40 outputs the respective pulse signals to the red, green, and blue light sources 21r, 21g, and 21b.

When the image reading device 10 reads an image in the color mode, the red, green, and blue light sources 21r, 21g, and 21b are switched at specific times to emit light based on a main scanning signal generated by the signal processing section 31. The red, green, and blue light sources 21r, 21g, and 21b are lighted at different times. The main scanning signal is asserted High at fixed time intervals. While one line of data is read, the main scanning signal is asserted High three times.

The lighting period of each of the red, green, and blue light sources 21r, 21g, and 21b corresponds to the pulse width that is input to the relevant one of the red, green, and blue light sources 21r, 21g, and 21b. The pulse widths can be set to any desired widths. Each of the red, green, and blue light sources 21r, 21g, and 21b can be lighted for a lighting-permitted period falling between the intervals of the main scanning signal. The duration of each lighting-permitted period is shorter than the duration of one interval of the main scanning signal. This is to avoid the influence of the signal noise from the lighting of the red, green, and blue light sources 21r, 21g, and 21b that takes place immediately before or immediately after the lighting-permitted period.

At the time of reading the original document M, the light-amount adjusting section 40 adjusts the pulse widths to obtain the amount of light necessary for reading the original document M. In other words, the light-amount adjusting section 40 adjusts the duty ratio thereby to adjust the lighting periods of the light source 21. The light-amount adjusting section 40 adjusts the pulse widths such that the white reference data indicating optimal values is obtained by reading the white reference plate 50. Preferably, the pulse widths are adjusted to maximize the dynamic range (the ratio of the maximum value to the minimum value) of the detection result obtained by the photo-detecting section 27.

In addition, to produce white light with high luminance and good white balance, the light-amount ratio between the red, green, and blue light is preferably adjusted to about 3:6:1. The present embodiment gives a high priority to the acquisition of a wide dynamic range in the color mode. For this purpose, the light-amount ratio between red, green, and blue light is adjusted in the signal processing performed by the signal processing section 31 after the photo-detecting section 27 generates a photo-detection signal.

On the other hand, when the image reading device 10 reads images in the monochrome mode, the red, green, and blue light sources 21r, 21g, and 21b emit light at the same time, which is one manner of the present disclosure.

The image reading device 10 sets the pulse widths, or equivalently the lighting periods, of each of the red, green, and blue light sources 21r, 21g, and 21b for use in the monochrome mode, based on the respective pulse widths of the red, green, and blue light sources 21r, 21g, and 21b set in the color mode and also on the white reference data obtained in the color mode. To produce white light with good white balance, the light-amount adjusting section 40 calculates the pulse widths for the monochrome mode by multiplying the respective pulse widths for the color mode by one of the terms of the corresponding color in the color ratio (3:6:1, which are the terms corresponding to red, green, and blue light, respectively).

Figure 3:
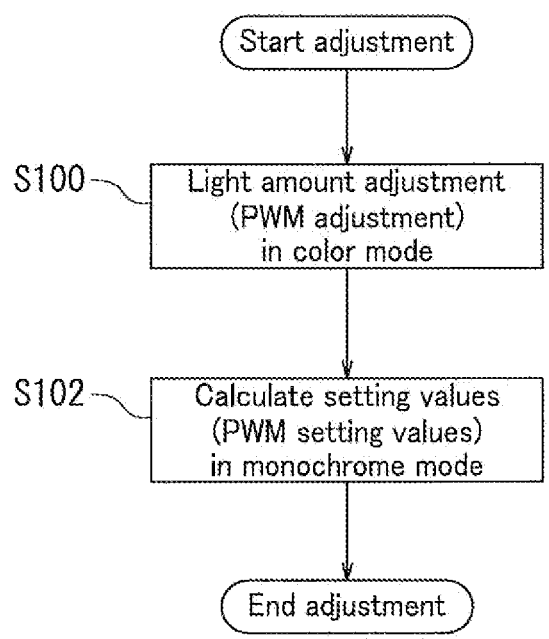
FIG. 3 is a flowchart of an image reading method performed by the image reading device according to the embodiment of the present disclosure.

With reference to FIGS. 1-3, the following describes an image reading method performed by the image reading device 10 as one embodiment of the present disclosure. FIG. 3 is a flowchart of the image reading method performed by the image reading device 10 according to the embodiment of the present disclosure.

S100: The light amount adjustment (PWM adjustment) is performed in the color mode. In particular, the light-amount adjusting section 40 adjusts the amount of light in the color mode. The light-amount adjusting section 40 adjusts the respective pulse widths to be applied to the red, green, and blue light sources 21r, 21g, and 21b. The light-amount adjusting section 40 makes the pulse width adjustment such that the white reference data obtained when the red, green, and blue light sources 21r, 21g, and 21b illuminates the white reference plate 50 approaches the target value. In the present embodiment, the target value is set for example to 240, out of the 256 grayscale levels (0-255). The target value is set to a value lower than 255 to allow for a case where the original document M is whither than the white reference plate 50 (to prevent white saturation which leads to blown out highlights in the image). The light-amount adjusting section 40 adjusts the pulse widths by binary search.

S102: The setting values (PWM setting values) for use in the monochrome mode are calculated. In particular, the light-amount adjusting section 40 calculates the pulse widths for use in the monochrome mode based on the pulse widths as adjusted in Step S100 and the white reference data. The following now describes the method for calculating the pulse widths for use in the monochrome mode.

The pulse widths adjusted in the color mode do not correspond to the color ratio between the red, green, and blue light of about 3:6:1. In view of this, each pulse width adjusted in the color mode is multiplied by the term of the corresponding color in the color ratio. The arithmetic operations are shown below as Expression 1-1 to 1-3.

$PRm = PRc \times \text{Term } R / (\text{Term } R + \text{Term } G + \text{Term } B)$   Expression 1-1

$PGm = PGc \times \text{Term } G / (\text{Term } R + \text{Term } G + \text{Term } B)$   Expression 1-2

$PBm = PBc \times \text{Term } B / (\text{Term } R + \text{Term } G + \text{Term } B)$   Expression 1-3

PRm denotes the pulse width applied to the red light source 21r in the monochrome mode. PGm denotes the pulse width applied to the green light source 21g in the monochrome mode. PBm denotes the pulse width applied to the blue light source 21b in the monochrome mode. PRc denotes the pulse width applied to the red light source 21r in the color mode. PGc denotes the pulse width applied to the green light source 21g in the color mode. PBc denotes the pulse width applied to the blue light source 21b in the color mode. Terms R, G, and B are the terms of the color ratio for producing white light with good white balance. Term R holds 3, Term G holds 6, and Term B holds 1.

The light-amount adjusting section 40 works out Expressions 1-1 to 1-3 to calculate the pulse widths for use in the monochrome mode. In this way, the pulse widths for use in the monochrome mode are adjusted in consideration of Terms R, U, and B.

Figure 4:
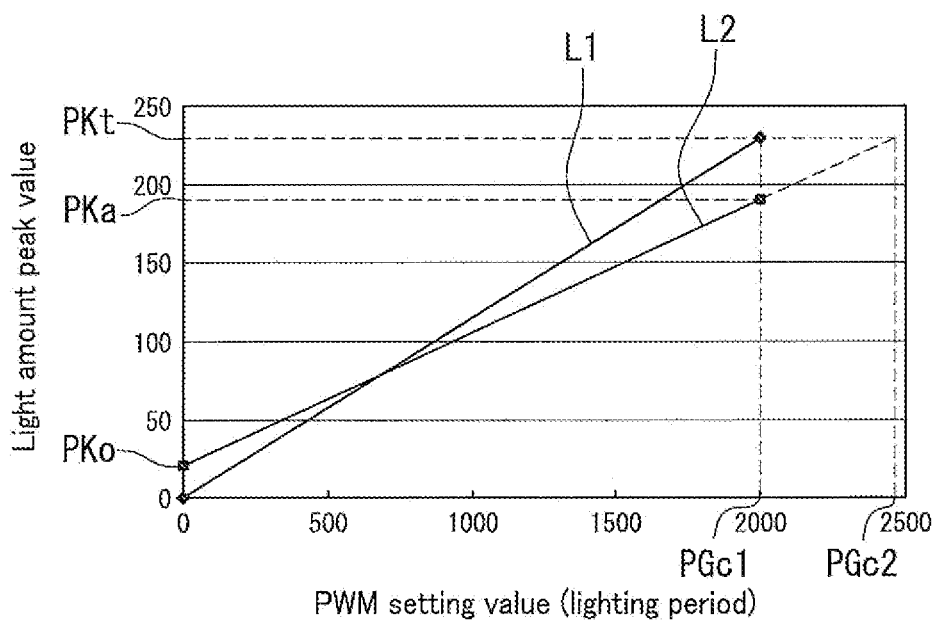
FIG. 4 is a graph showing the relationship between PWM setting values and peak values.

Unfortunately, there may be a case where the amount of light obtained as a result of the pulse width adjustment in the color mode falls short of the target value. In such a case, the pulse widths for use in the monochrome mode cannot be calculated accurately. In addition, the presence of an offset value also renders it impossible to accurately calculate the pulse widths for use in the monochrome mode. With reference to FIG. 4, the following describes the cases where the amount of light obtained as a result of the pulse width adjustment in the color mode falls short of the target value or where an offset value is present.

FIG. 4 is a graph showing the relationship between the PWM setting values and the peak values. The horizontal axis represents the PWM setting values (lighting period), and the vertical axis represents the peak values of the amount of light. The peak value is a maximum value in the white reference data obtained by reading regions of the white reference plate 50 in the main scanning direction. In the graph, PKt denotes the target value. L1 denotes the line representing the relationship between the PWM setting values and the peak values on condition that the white reference data obtained in the color mode is without either a deviation from the target value or an offset. L2 denotes the line representing the relationship between the PWM setting values and the peak values on condition that the amount of light falls short of the target value even after the pulse width adjustment in the color mode and that an offset is present. The PWM setting values are limited to PGc1 which is the upper limit imposed due to the limitations on the lighting-permitted period of the light source 21. In FIG. 4, the upper limit of the PWM setting values is 2000.

In the case of L1, the peak value has reached the target value PKt at PGc1. Thus, the light-amount adjusting section 40 can calculate the pulse widths in the monochrome mode by working out Expressions 1-1 to 1-3. That is, L1 shows an ideal relationship between the PWM setting values and the peak values of the amount of light.

Yet, in practice, there may be a case where the peak value does not reach the target value PKt at PGc1. In addition, there may be a case where the PWM setting value 0 does not correspond to the peak value 0 and thus involves an offset PKo. In such a case, with the PGc1 corresponding at most to the peak value PKa, the light-amount adjusting section 40 cannot obtain correct PWM setting values by working out Expressions 1-1 to 1-3.

In view of the above, the PWM setting value PGc2 which is a point on L2 where the peak value PKt would reach the target value is calculated. For example, when the target value PKt is 240, the offset PKo is 25, and PKa is 190, the value of PGc2 is calculated as follows.

(Target value $PKt$−Offset $PKo$)×$PGc1$/(Peak value $PKa$−Offset $PKo$)=(240−25)×2000/(190−25) ≈2457

Then, the value of PGc2 is multiplied by each term in the color ratio to calculate the PWM setting values in the monochrome mode. In the manner described above, the light-amount adjusting section 40 calculates the pulse widths using the arithmetic operations formulated in considerations of the peak values and the offset value of the white reference data. The arithmetic operations are shown below as Expression 2-1 to 2-3.

$PRm$={(Target value−$R$ offset vale)}×$PRc$/($R$ peak value−$R$ offset value)×Term $R$/(Term $R$+Term $G$+Term $B$)   Expression 2-1

$PGm$={(Target value−$G$ offset value)×$PGc$/($G$ peak value−$G$ offset value)}×Term $G$/(Term $R$+Term $G$+Term $B$)   Expression 2-2

$PBm$={(Target value−$B$ offset value)×$PBc$/($B$ peak value−$B$ offset value)}×Term $B$/(Term $R$+Term $G$+Term $B$)   Expression 2-3

The target value denotes the target value of the amount of light. The R offset value denotes the offset value of the red light source 21r. The G offset value denotes the offset value of the green light source 21g. The B offset value denotes the offset value of the blue light source 21b. The offset value is used as an expected value of black reference data. Explanation is omitted for the signs that are in common with Expressions 1-1 to 1-3.

The light-amount adjusting section 40 works out Expressions 2-1 to 2-3 to calculate the pulse widths for use in the monochrome mode. In this way, the pulse widths for use in the monochrome mode are adjusted in consideration of Terms R, G, and B of the color ratio. The above arithmetic operations ensures that the pulse widths for use in the monochrome mode can be calculated highly accurately when the amount of light falls short of the target value as a result of the pulse width adjustment in the color mode. In addition, the pulse widths for use in the monochrome mode can be calculated highly accurately despite the presence of an offset value.

As has been described above with reference to FIGS. 1-4 regarding the image reading device 10, the light-amount adjusting section 40 sets the lighting periods (pulse widths) of the red, green, and blue light sources 21r, 21g, and 21b for reading in the monochrome mode based on: the lighting periods (pulse widths) of the red, green, and blue light sources 21r, 21g, and 21b set for reading in the color mode by using the white reference plate 50; and the results (peak values) of the signal processing performed by the signal processing section 31 on the photo-detection signal detected by the photo-detecting section 27 when the white reference plate 50 is illuminated with light emitted by the red, green, and blue light sources 21r, 21g, and 21b for the lighting periods set in the color mode. Therefore, regardless of whether the amount of light obtained after the PWM adjustment in the color mode falls short of the target value, highly accurate setting values for use in the monochrome mode can be yielded by arithmetic operations.

In addition, alternatively to an expected value for the black reference, the actual peak value measured on the black reference may be used as the offset value in Expressions 2-1 to 2-3. The arithmetic operations are shown below.

$PRm$={(Target value−$R$ black-reference-peak-value max)×$PRc$/($R$ peak value−$R$ black-reference-peak-value max)}×Term $R$/(Term $R$+Term $G$+Term $B$)   Expression 3-1

$PGm$={(Target value−$G$ black-reference-peak-value max)×$PGc$/($G$ peak value−$G$ black-reference-peak-value max)}×Term $G$/(Term $R$+Term $G$+Term $B$)   Expression 3-2

$PBm$={(Target value−$B$ black-reference-peak-value max)×$PBc$/($B$ peak value−$B$ black-reference-peak-value max)}×Term $B$/(Term $R$+Term $G$+Term $B$)   Expression 3-3

In the above expressions, R black-reference-peak-value max, G black-reference-peak-value max, and B black-reference-peak-value max each denote a value of the actually measured black reference data. The image reading device 10 additionally includes a black reference plate, and the black reference data is obtained by illuminating the black reference plate with red, green, and blue light that are respectively emitted by the red, green, and blue light sources 21r, 21g, and 21b. Alternatively, the black reference data can be obtained, without using the black reference data, under the state where the red, green, and blue light sources 21r, 21g, and 21b are all turned off, that is under pitch dark.

The light-amount adjusting section 40 works out Expressions 3-1 to 3-3 to calculate the pulse widths for use in the monochrome mode. With the use of the actual measurement values of the black reference data as the offset value, even more accurate setting values can be calculated.

Figure 5:
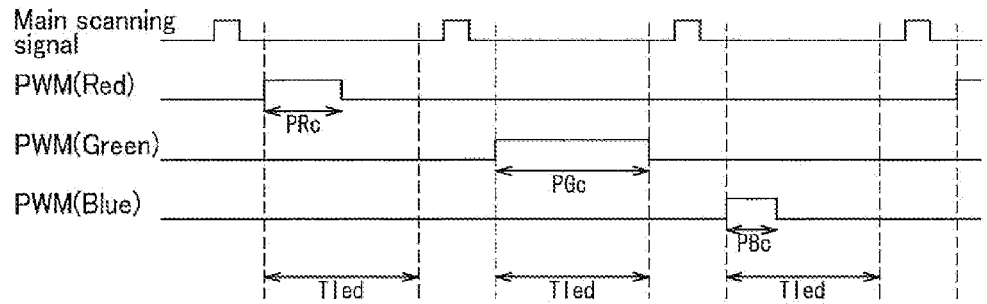
FIG. 5 is a timing chart of pulse signals used in a color mode by the image reading device according to the embodiment of the present disclosure.

With reference to FIG. 5, the description is given of the timing chart of the pulse signals applied in the color mode by the image reading device 10 according to the embodiment of the present disclosure. FIG. 5 is the timing chart of pulse signals applied in the color mode by the image reading device 10 according to the embodiment of the present disclosure.

The timing chart shown in FIG. 5 is of the pulse signals after the pulse width adjustment made by using the white reference data in the color mode. The main scanning signal is asserted High at the fixed time intervals and asserted High three times while one line of data is read. The time periods immediately before and immediately after each High duration of the main scanning signal are lighting-prohibited periods in which lighting of the light source 21 is prohibited. In the figure, Tled denotes a lighting-permitted period in which lighting of the light source 21 is permitted. Tled falls between two successive High durations of the main scanning signal and is shorter than the duration of one interval of the main scanning signal in order to avoid influence of the lighting of the light source 21 immediately before or immediately after the Tled period.

PWM (Red) denotes a pulse signal applied to the red light source 21r. PWM (Green) denotes a pulse signal applied to the green light source 21g. PWM (Blue) denotes a pulse signal applied to the blue light source 21b. The light source 21 (the red, green, and blue light sources 21r, 21g, and 21b) emits light (red light, green light, and blue light, respectively) for each High duration of the respective pulse signals.

PRc denotes the pulse width of the pulse signal PWM (Red) applied to the red light source 21r in the color mode. PGc denotes the pulse width of the pulse signal PWM (Green) applied to the green light source 21g in the color mode. PBc denotes the pulse width of the pulse signal PWM (Blue) applied to the blue light source 21b in the color mode. The pulse widths PRc, PGc, and PBc are adjusted by the light-amount adjusting section 40.

The pulse widths PRc and PBc are each adjusted to ensure that the peak value of the amount of light reaches the target value. On the other hand, the pulse width PGc is adjusted to a period spanning from the start to the end of the lighting-permitted period Tled because the peak value of the amount of light emitted during the lighting-permitted period Tled fails to reach the target value.

Figure 6:
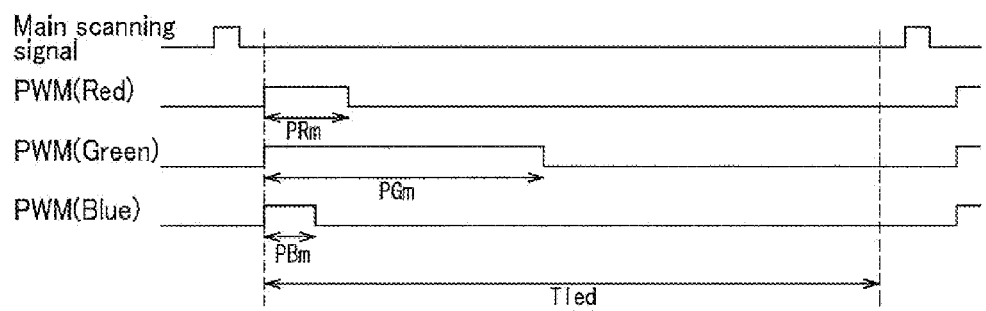
FIG. 6 is a timing chart of pulse signals used in a monochrome mode by the image reading device according to the embodiment of the present disclosure.

Next, with reference to FIG. 6, the description is given of the timing chart of the pulse signals applied in the monochrome mode by the image reading device 10 according to the embodiment of the present disclosure. FIG. 6 is the timing chart of pulse signals applied in the monochrome mode by the image reading device 10 according to the embodiment of the present disclosure. No overlapping description is given as to the contents already described above with reference to the timing chart shown in FIG. 5. The intervals of the main scanning signal in the monochrome mode are equal to the intervals of the main scanning signal in the color mode.

In the figure, PRm denotes the pulse width of the pulse signal PWM (Red) applied to the red light source 21r in the monochrome mode. PGm denotes the pulse width of the pulse signal PWM (Green) applied to the green light source 21g in the monochrome mode. PBm denotes the pulse width of the pulse signal PWM (Blue) applied to the blue light source 21b in the monochrome mode. The pulse widths PRc, PGc, and PBc are adjusted by the light-amount adjusting section 40.

The pulse widths PRm, PGm, and PBm for use in the monochrome mode are calculated by the light-amount adjusting section 40 based on the pulse widths PRc, PGc, and PBc for use in the color mode and also on the white reference data obtained in the color mode.

Figure 7:
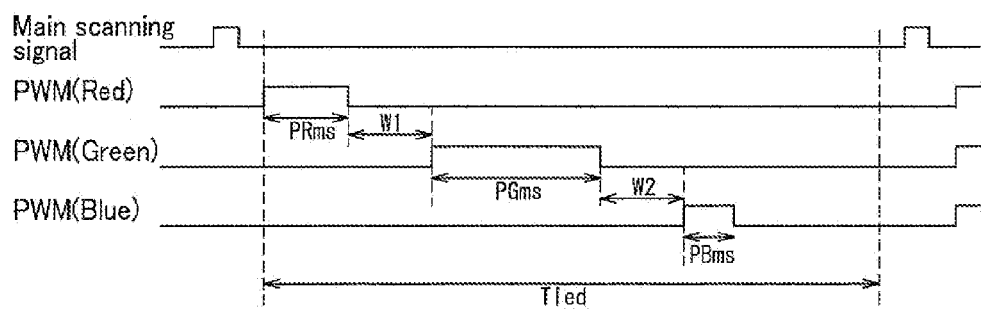
FIG. 7 is a timing chart of pulse signals used in the monochrome mode by the image reading device according to the embodiment of the present disclosure.

Depending on the circuitry of the image reading device 10, a large current may flow in the monochrome mode. In such a case, the red, green, and blue light sources 21r, 21g, and 21b cannot be lighted at the same time as in the timing chart of FIG. 6. Therefore, the red, green, and blue light sources 21r, 21g, and 21b are lighted at different times as shown in FIG. 7. Note that the amount of light accurately detectable by the photo-detecting section 27 in the Low duration of the main scanning signal is limited to a specific range.

With reference to FIG. 7, the following describes the timing chart for the case where lighting of the red, green, and blue light sources 21r, 21g, and 21b at the same time is not possible. FIG. 7 is the timing chart of pulse signals applied in the monochrome mode by the image reading device 10 according to the embodiment of the present disclosure. No overlapping description is given as to the contents already described above with reference to the timing chart of FIG. 5 or 6.

In each Low duration of the main scanning signal, the red, green, and blue light sources 21r, 21g, and 21b are sequentially lighted in the order in which the pulse signals PWM (Red, Green, and Blue) respectively applied to the red, green, and blue light sources 21r, 21g, and 21b are asserted High. A wait period W1 is provided between the pulse width in the pulse signal PWM (Red) applied to the red light source 21r and the pulse width of the pulse signal PWM (Green) applied to the green light source 21g. A wait period W2 is provided between the pulse width in the pulse signal PWM (Green) applied to the green light source 21g and the pulse width of the pulse signal PWM (Blue) applied to the blue light source 21b. Each wait time is provided to reduce the influence of the signal noise resulting from the lighting of the light source that takes place before and after the wait period.

When the duration between the leading edge of a pulse in the pulse signal PWM (Red) applied to the red light source 21r and the trailing edge of a pulse in the pulse signal PWM (Blue) applied to the blue light source 21b is longer than the lighting-permitted period Tled, that is when the condition where PRm+PGm+PBm+W1+W2>Tled is satisfied, the light-amount adjusting section 40 newly calculates pulse widths PRm, PGm, and PBm for use in the monochrome mode by using Expressions 4-1 to 4-3 below.

$$PRms = PRm \times (Tled - W1 - W2)/(PRm + PGm + PBm) \quad \text{Expression 4-1}$$

$$PGms = PGm \times (Tled - W1 - W2)/(PRm + PGm + PBm) \quad \text{Expression 4-2}$$

$$PBms = PBm \times (Tled - W1 - W2)/(PRm + PGm + PBm) \quad \text{Expression 4-3}$$

The light-amount adjusting section 40 works out Expressions 4-1 to 4-3 to shorten the pulse widths PRm, PGm, and PBm by the same percentage. As a result, the time period between the leading edge of the pulse in the pulse signal PWM (Red) applied to the red light source 21r and the trailing edge of the pulse in the pulse signal PWM (Blue) applied to the blue light source 21b falls within the lighting-permitted period Tled.

As has been described with reference to FIG. 7, in the monochrome mode, the light-amount adjusting section 40 newly sets lighting periods (PRms, PGms, and PBms) of the red, green, and blue light sources 21r, 21g, and 21b based on: the previously set lighting periods (PRm, PGm, and PBm) of the red, green, and blue light sources 21*r*, and 21*g*, and 21*b*; and on the lighting wait periods (W1 and W2) of the red, green, and blue light sources 21*r*, and 21*g*, and 21*b*. In this way, the red, green, and blue light sources 21*r*, 21*g*, and 21*b* can be lighted within the respective lighting-permitted periods.

Figure 8:
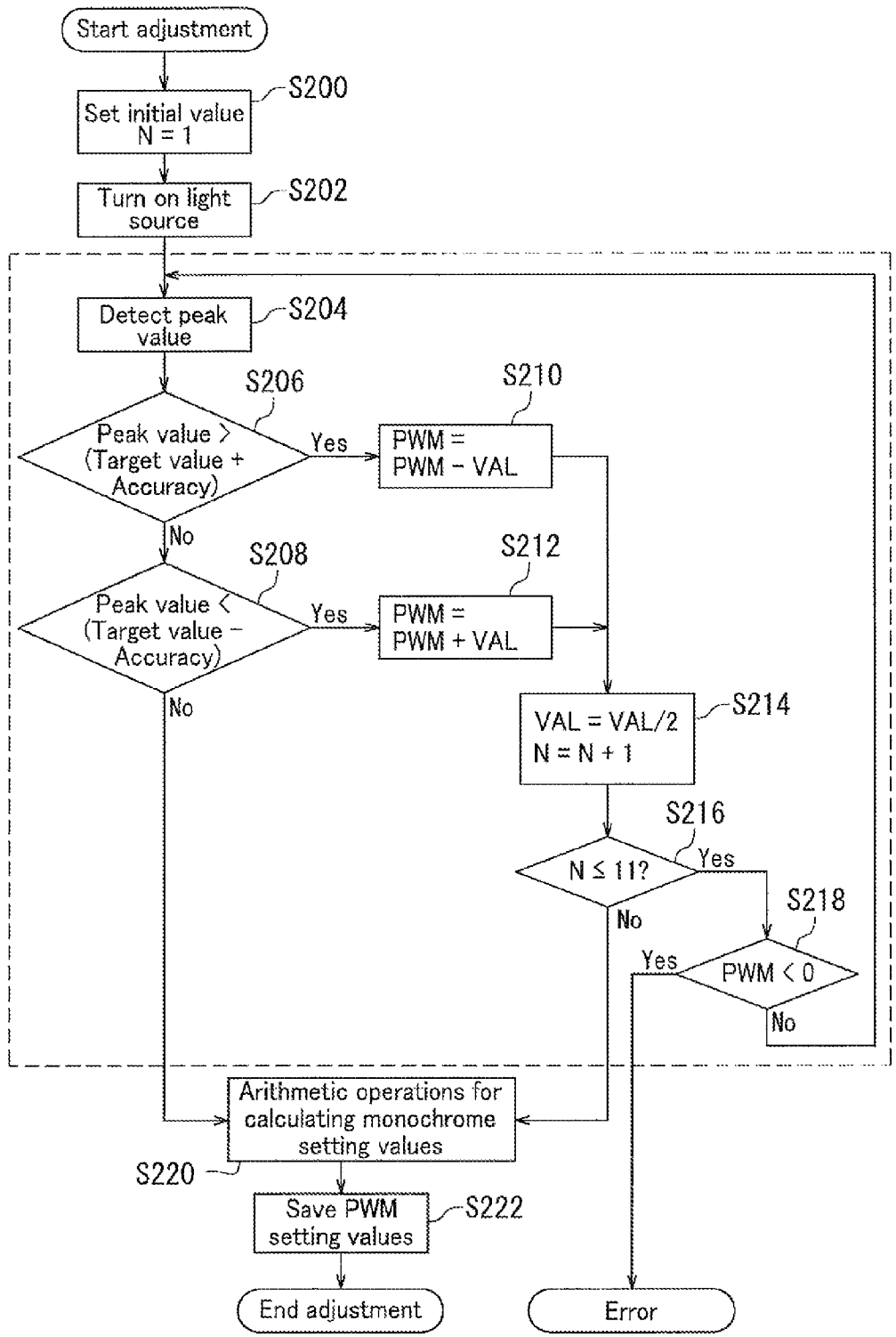
FIG. 8 is a flowchart of an image reading method performed by the image reading device according to the embodiment of the present disclosure.

Next, the following describes the image reading method performed by the image reading device 10 according to the embodiment of the present disclosure, with reference to FIG. 8. FIG. 8 is a flowchart showing the image reading method performed by the image reading device 10 according to the embodiment of the present disclosure. In the image reading method according to the present embodiment, the pulse widths are set through Steps S200 to S222 as shown in FIG. 8. In the subsequent reading of the original document M in the color mode or in the monochrome mode, the light source 21 is lighted according to the pulse widths set through the above steps.

In Steps S204 to S218, the lighting periods (pulse widths) of the red, green, and blue light sources 21*r*, 21*g*, and 21*b* for reading in the color mode are set by using binary search. The maximum search number in the binary search is ten.

In Step S220, the lighting periods of the red, green, and blue light sources 21*r*, 21*g*, and 21*b* are set for reading in the monochrome mode. The settings are made based on: the lighting periods (pulse widths) of the red, green, and blue light sources 21*r*, 21*g*, and 21*b* set for reading in the color mode; and the results (peak values) obtained through signal processing performed by the signal processing section 31 on the photo-detection signal that is obtained by the photo-detecting section 27 from the white reference plate 50 when the white reference plate 50 is illuminated with light emitted by the red, green, and blue light sources 21*r*, 21*g*, and 21*b* for the lighting periods (pulse widths) set in the color mode. The following describes each step separately.

Step S200: The initial value of the search number in the binary search is set (N=1).

Step S202: The red, green, and blue light sources 21*r*, 21*g*, and 21*b* are lighted in the color mode. The respective lighting periods are set to their initial values.

The pulse width adjustment through Steps S204 to S218 is separately performed for each color.

Step S204: A peak value in the white reference data is detected by reading the white reference plate 50.

Step S206: Determination is made as to whether the condition where Peak value>(Target value+Accuracy) is true. When the condition where Peak value>(Target value+Accuracy) is true (Step S206: Yes), the image reading process moves onto Step S210. When the condition where Peak value>(Target value+Accuracy) is not true (Step S206: No), the image reading process moves onto Step S208. The accuracy is set as the tolerance for the target value.

Step S208: Determination is made as to whether the condition where Peak value<(Target value−Accuracy) is true. When the condition where Peak value<(Target value−Accuracy) is not true (Step S208: No), the target value is within the permissible accuracy (the condition (Target value−Accuracy) <Peak value<(Target value+Accuracy) is true) so that the pulse width adjustment in the color mode is completed. Therefore, the image reading process moves onto Step S220. When the condition where Peak value<(Target value−Accuracy) is true (Step S208: Yes), the image reading process moves onto Step S212.

Step S210: When the condition where Peak value>(Target value+Accuracy) is determined to be true in Step S206 (Step S206: Yes), the pulse width is wider than the pulse width corresponding to the target value, which means that the peak value of the amount of light is greater than the target value. The light-amount adjusting section 40 therefore performs the arithmetic operation of PWM=PWM−VAL to reduce the pulse width. Note that VAL is set to an initial value.

Step S212: When the condition where Peak value<(Target value−Accuracy) is determined to be true in Step S208 (Step S208: Yes), the pulse width is narrower than the pulse width corresponding to the target value, which means that the peak value is small. The light-amount adjusting section 40 therefore performs the arithmetic operation PWM=PWM+VAL to increase the pulse width.

Step S214: The light-amount adjusting section 40 performs the arithmetic operations VAL=VAL/2 and N=N+1 to update the values of VAL and N.

Step S216: The light-amount adjusting section 40 determines whether the condition where N≤11 is true. When the light-amount adjusting section 40 determines that the condition where N≤11 is not true (Step S216: No), the count in the binary search has reached the upper limit of ten times. Therefore, the image reading process moves onto Step S220. When the light-amount adjusting section 40 determines that condition where N≤11 is true (Step S216: Yes), the image reading process moves onto Step S218.

Step S218: The light-amount adjusting section 40 determines whether the condition where PWM<0 is true. When determining that the condition PWM<0 is true (Step S218: Yes), the light-amount adjusting section 40 determines that an error has occurred. For example, when VAL is set to a value larger than the initial value of the pulse width, the arithmetic operation performed in Step S210 may yield a negative value. When the light-amount adjusting section 40 determines that the condition where PWM<0 is not true (Step S218: No), the image reading process goes back to Step S204 to read the white reference plate 50 again. Thereafter, when the peak value is not within the permissible accuracy as described above, the peak value of the white reference data is detected by using the pulse width adjusted by performing the arithmetic operation in Step S210 or S212.

By repeating the iteration of binary search from Steps 204 to S218, the pulse widths for use in the color mode are adjusted such that the peak value approaches the target value.

Step S220: The light-amount adjusting section 40 performs the arithmetic operations for calculating the pulse widths for use in the monochrome mode based on the pulse widths set for use in the color mode through Steps S200 to S218 and on the white reference data. In particular, the light-amount adjusting section 40 performs the arithmetic operations of Expressions 2-1 to 2-3 or Expressions 3-1 to 3-3 to calculate the pulse widths for use in the monochrome mode.

Step S222: The setting values of the pulse widths calculated through Steps S204 to S218 and S220 are saved.

Thereafter, the image of the original document M is read in the color mode or in the monochrome mode by using the pulse widths as set above.

In the description given above, Expressions 3-1 to 3-3 and Expressions 4-1 to 4-3 may be modified to omit the offset values.

In the description given above, in addition, Expressions 3-1 to 3-3 and Expressions 4-1 to 4-3 may be modified to use the average value of the white reference data, instead of the peak values of the white reference data (R peak value, G peak value, and B peak value).

In addition, Expressions 4-1 to 4-3 may be modified to use the average value of the black reference data instead of the black-reference-peak-values (R black-reference-peak-value max, G black-reference-peak-value max, and B black-reference-peak-value max).

In the description given above with reference to FIG. 2, the light-amount adjusting section 40 sets the lighting periods of the red, green, and blue light respectively emitted from the red, green, and blue light sources 21r, 21g, and 21b, through the signal processing performed by the signal processing section 31 on the photo-detection signal of the photo-detecting section 27. However, the present disclosure is not limited to such. The detection results by the photo-detecting section 27 may be directly input to the light-amount adjusting section 40 rather than via the signal processing section 31, and the light-amount adjusting section 40 may set the lighting periods of red, green, and blue light respectively emitted from the red, green, and blue light sources 21r, 21g, and 21b.

Figure 9:
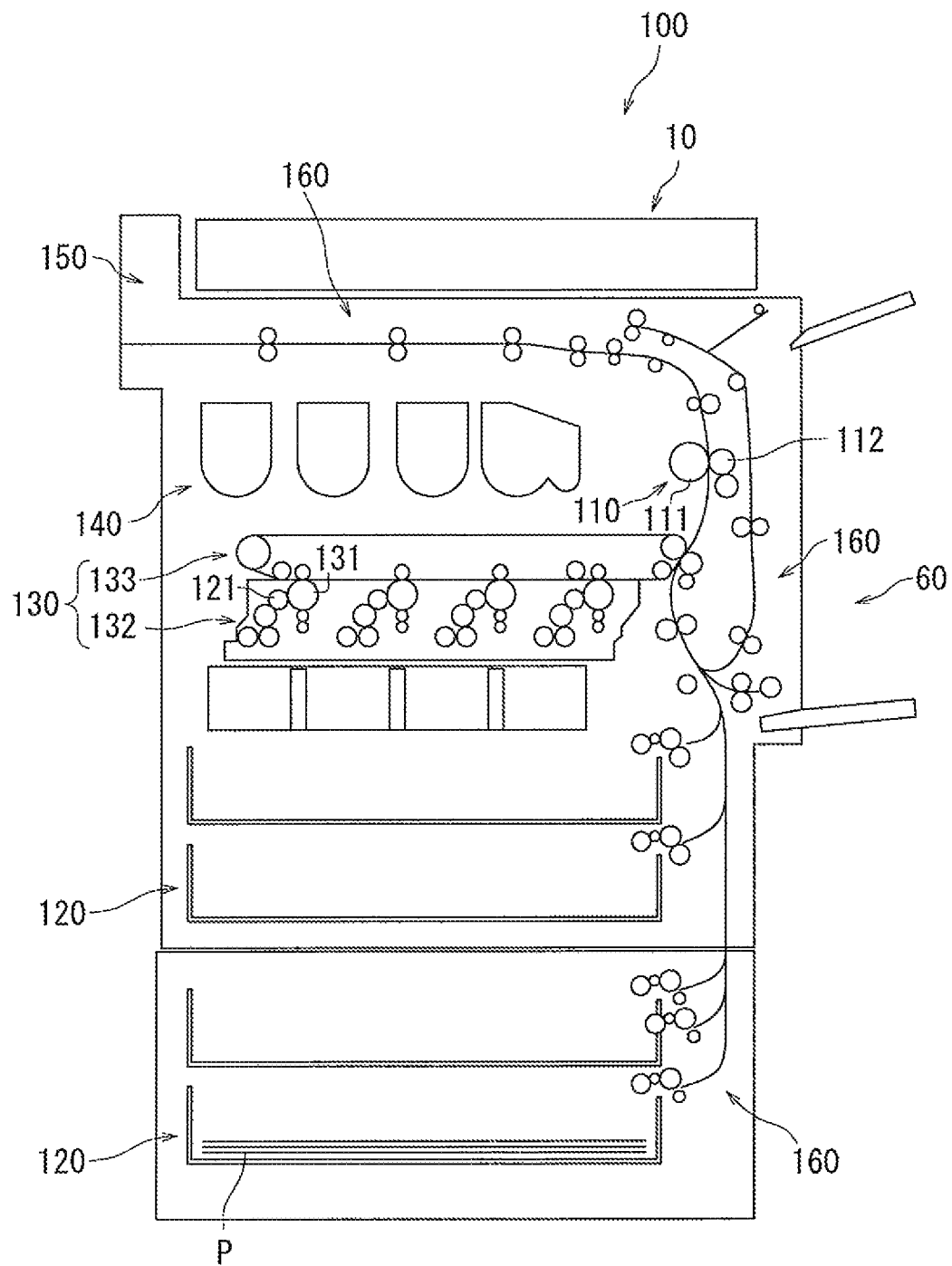
FIG. 9 is a schematic view of an image forming apparatus according to the embodiment of the present disclosure.

FIG. 9 is a schematic view of an image forming apparatus 100 according to the embodiment of the present disclosure. In the following description of the present embodiment, the image forming apparatus 100 is a copier. The image forming apparatus 100 includes an image reading device 10 and an image forming section 60. The image forming section 60 includes a fixing device 110, a paper feed cassette 120, an imaging section 130, a toner replenishment device 140, a paper ejecting section 150, and a paper conveyance section 160. The image forming section 60 forms an image based on a result of reading by the image reading device 10.

The paper feed cassette 120 stores paper P for printing. At the time of producing a copy, the paper conveyance section 160 conveys the paper P stored in the paper feed cassette 120 sequentially to the imaging section 130 and the fixing unit 110 to be ejected from the paper ejecting section 150.

The imaging section 130 forms a toner image of the paper P. The imaging section 130 includes a plurality of photosensitive members 131, a plurality of developing devices 132, and a transfer device 133.

The photosensitive member 131 forms an electrostatic latent image by a laser scanned based on an electron signal describing a document image generated by the image reading device 10. Each developing device 132 includes a developing roller 121. Each developing roller 121 supplies toner to the corresponding photosensitive member 131 to develop the electrostatic latent image. As a result, a toner image is formed on each photosensitive member 131. The toner is supplied form the toner replenishment device 140 to the developing device 132.

The transfer device 133 transfers the toner images formed on the respective photosensitive members 131 to the paper P.

The fixing device 110 fuses to fix the unfixed toner image formed by the imaging section 130 to the paper P by applying heat and pressure to the paper P by a fixing member 111 and a pressure member 112.

Alternatively to the photo-detecting section 27 including charge coupled devices (CCDs), the image reading device 10 may include the photo-detecting section 27 employing a Contact Image Sensor (CIS) and thus includes a CMOS image sensor.

In addition, the original document M readable by the image reading device 10 is not limited to paper. For example, it may be cloth or a three dimensional object with a thickness.

The image forming apparatus 100 is not limited to a copier and may be any of a copier, a printer, a facsimile machine, or a multi-function peripheral having such functions.

What is claimed is:

1. An image reading device for performing reading by switching between a color mode and a monochrome mode, comprising:
    a red light source configured to emit red light;
    a green light source configured to emit green light;
    a blue light source configured to emit blue light;
    a white reference plate;
    a light-amount adjusting section configured to adjust an amount of the red light, an amount of the green light, and an amount of the blue light to be emitted by the red light source, the green light source, and the blue light source, respectively; and
    a photo-detecting section configured to detect the red light, the green light, and the blue light emitted by the red light source, the green light source, and the blue light source, respectively, wherein
    the light-amount adjusting section sets a lighting period of each of the red light source, the green light source, and the blue light source for reading in the monochrome mode, the settings being made based on
        a lighting period of each of the red light source, the green light source, and the blue light source set for reading in the color mode, and
        a result of detection performed by the photo-detecting section when the white reference plate is illuminated with the red light, the green light, and the blue light respectively emitted by the red light source, the green light source, and the blue light source for the respective lighting periods set for reading in the color mode, and
    the light-amount adjusting section makes the settings of the lighting periods of the red light source, the green light source, and the blue light source for reading in the monochrome mode, based on
        the lighting period of each of the red light source, the green light source, and the blue light source set for reading in the color mode,
        the result of the detection performed by the photo-detecting section when the white reference plate is illuminated with the red light, the green light, and the blue light, and
        a predetermined black reference value.

2. An image reading device for performing reading by switching between a color mode and a monochrome mode, comprising:
    a red light source configured to emit red light;
    a green light source configured to emit green light;
    a blue light source configured to emit blue light;
    a white reference plate;
    a light-amount adjusting section configured to adjust an amount of the red light, an amount of the green light, and an amount of the blue light to be emitted by the red light source, the green light source, and the blue light source, respectively; and
    a photo-detecting section configured to detect the red light, the green light, and the blue light emitted by the red light source, the green light source, and the blue light source, respectively, wherein
    the light-amount adjusting section sets a lighting period of each of the red light source, the green light source, and the blue light source for reading in the monochrome mode, the settings being made based on
        a lighting period of each of the red light source, the green light source, and the blue light source set for reading in the color mode, and
        a result of detection performed by the photo-detecting section when the white reference plate is illuminated with the red light, the green light, and the blue light respectively emitted by the red light source, the green light source, and the blue light source for the respective lighting periods set for reading in the color mode,
    the light-amount adjusting section makes the settings of the lighting periods of the red light source, the green light source, and the blue light source for reading in the monochrome mode, based on
the lighting period of each of the red light source, the green light source, and the blue light source set for reading in the color mode,
the result of the detection performed by the photo-detecting section when the white reference plate is illuminated with the red light, the green light, and the blue light, and
a result of detection of a black reference performed by the photo-detecting section.

3. An image reading device according to claim 2, further comprising
a black reference plate, wherein
the red light source, the green light source, and the blue light source respectively emit the red light, the green light, and the blue light to the black reference plate for the detection of the black reference by the photo-detecting section.

4. An image reading device according to claim 2, wherein
the red light source, the green light source, and the blue light source each go off for the detection of the black reference by the photo-detecting section.

5. An image reading device for performing reading by switching between a color mode and a monochrome mode, comprising:
a red light source configured to emit red light;
a green light source configured to emit green light;
a blue light source configured to emit blue light;
a white reference plate;
a light-amount adjusting section configured to adjust an amount of the red light, an amount of the green light, and an amount of the blue light to be emitted by the red light source, the green light source, and the blue light source, respectively; and
a photo-detecting section configured to detect the red light, the green light, and the blue light emitted by the red light source, the green light source, and the blue light source, respectively, wherein
the light-amount adjusting section sets a lighting period of each of the red light source, the green light source, and the blue light source for reading in the monochrome mode, the settings being made based on
a lighting period of each of the red light source, the green light source, and the blue light source set for reading in the color mode, and
a result of detection performed by the photo-detecting section when the white reference plate is illuminated with the red light, the green light, and the blue light respectively emitted by the red light source, the green light source, and the blue light source for the respective lighting periods set for reading in the color mode, and
in the monochrome mode, the red light source, the green light source, and the blue light source respectively emit the red light, the green light, and the blue light at different times.

6. An image reading device according to claim 5, wherein
the light-amount adjusting section newly sets a lighting period of each of the red light source, the green light source, and the blue light source for reading in the monochrome mode, the new settings being made based on
the lighting period of each of the red light source, the green light source, and the blue light source previously set for reading in the monochrome mode, the previous settings having been made based on
the lighting period of each of the red light source, the green light source, and the blue light source set for reading in the color mode, and
the result of the detection performed by the photo-detecting section when the white reference plate is illuminated with the red light, the green light, and the blue light respectively emitted by the red light source, the green light source, and the blue light source for the respective lighting periods set for reading in the color mode, and
a lighting wait period of each of the red light source, the green light source, and the red light source set for reading in the monochrome mode.

7. An image reading device for performing reading by switching between a color mode and a monochrome mode, comprising:
a red light source configured to emit red light;
a green light source configured to emit green light;
a blue light source configured to emit blue light;
a white reference plate;
a light-amount adjusting section configured to adjust an amount of the red light, an amount of the green light, and an amount of the blue light to be emitted by the red light source, the green light source, and the blue light source, respectively; and
a photo-detecting section configured to detect the red light, the green light, and the blue light emitted by the red light source, the green light source, and the blue light source, respectively, wherein
the light-amount adjusting section sets a lighting period of each of the red light source, the green light source, and the blue light source for reading in the monochrome mode, the settings being made based on
a lighting period of each of the red light source, the green light source, and the blue light source set for reading in the color mode, and
a result of detection performed by the photo-detecting section when the white reference plate is illuminated with the red light, the green light, and the blue light respectively emitted by the red light source, the green light source, and the blue light source for the respective lighting periods set for reading in the color mode, and
the light-amount adjusting section adjusts the lighting periods of the red light source, the green light source, and the blue light source set for reading in the color mode such that the result of the detection performed by the photo-detecting section when the white reference plate is illuminated with the red light, the green light, and the blue light respectively emitted by the respective light sources approaches a predetermined target value.

8. An image reading device according to claim 7, wherein
the light-amount adjusting section performs a binary search to adjust the lighting periods of the red light source, the green light source, and the blue light source set for reading in the color mode.

9. An image reading device according to claim 7, wherein
the photo-detecting section generates a photo-detection signal,
the image reading device further comprising a signal processing section configured to perform signal processing on the photo-detection signal.

10. An image reading device according to claim 9, wherein
the photo-detecting section generates an analog signal as the photo-detection signal, and
the signal processing section includes an analog front end configured to convert the analog signal into a digital signal, and an image processing section configured to perform signal processing on the digital signal.

11. An image reading device according to claim 7, wherein in the monochrome mode, the red light source, the green light source, and the blue light source respectively emit the red light, the green light, and the blue light at the same time.

12. An image forming apparatus comprising:

an image reading device for performing reading by switching between a color mode and a monochrome mode; and an image forming section configured to form an image based on a result of reading by the image reading device, wherein the image reading device includes
   a red light source configured to emit red light,
   a green light source configured to emit green light,
   a blue light source configured to emit blue light,
   a white reference plate,
   a light-amount adjusting section configured to adjust an amount of the red light, an amount of the green light, and an amount of the blue light to be emitted by the red light source, the green light source, and the blue light source, respectively, and
   a photo-detecting section configured to detect the red light, the green light, and the blue light emitted by the red light source, the green light source, and the blue light source, respectively, and the light-amount adjusting section sets a lighting period of each of the red light source, the green light source, and the blue light source for reading in the monochrome mode, the settings being made based on
   a lighting period of each of the red light source, the green light source, and the blue light source set for reading in the color mode, and
   a result of detection performed by the photo-detecting section when the white reference plate is illuminated with the red light, the green light, and the blue light respectively emitted by the red light source, the green light source, and the blue light source for the respective lighting periods set for reading in the color mode.

* * * * *